UNITED STATES PATENT OFFICE.

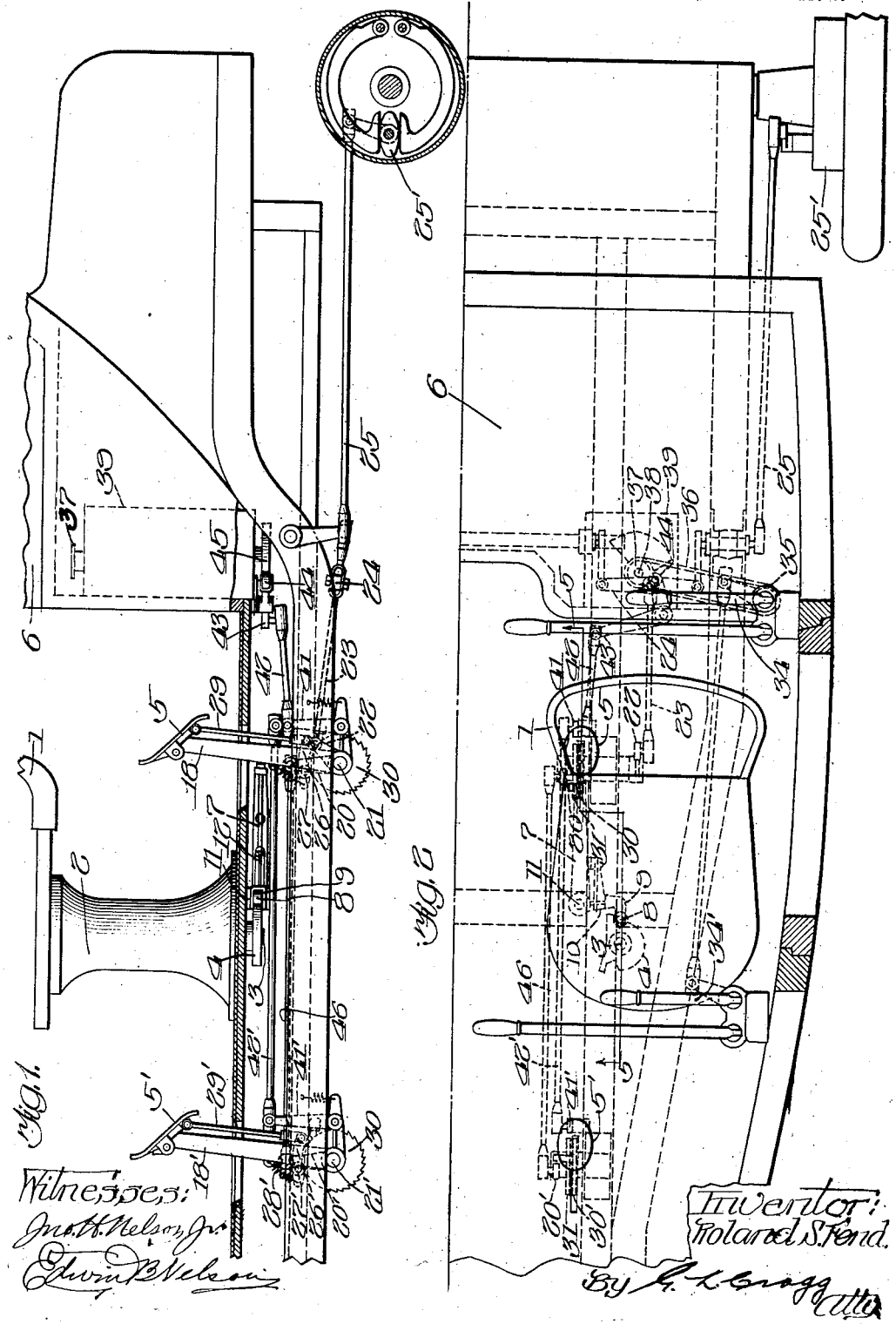

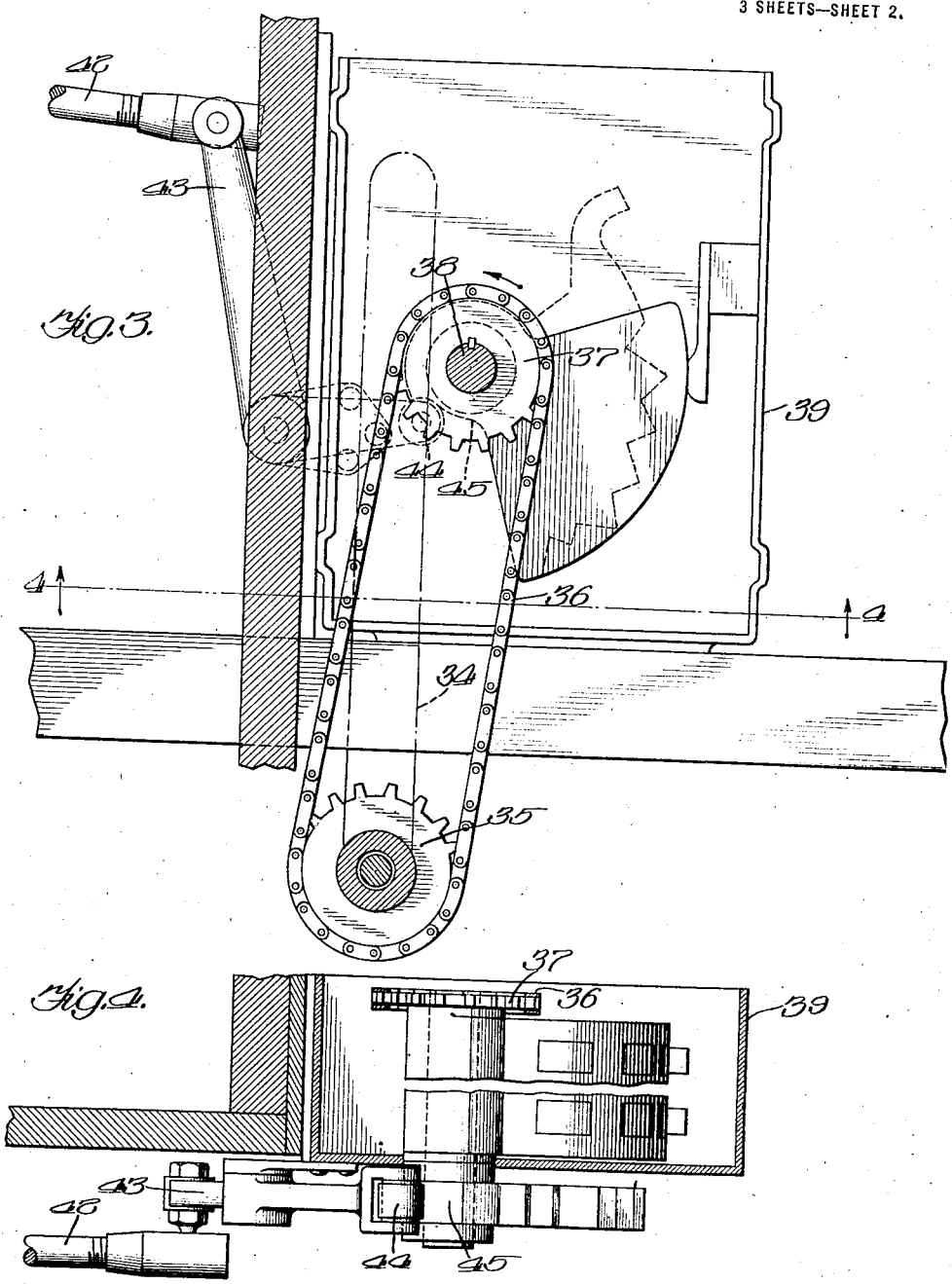

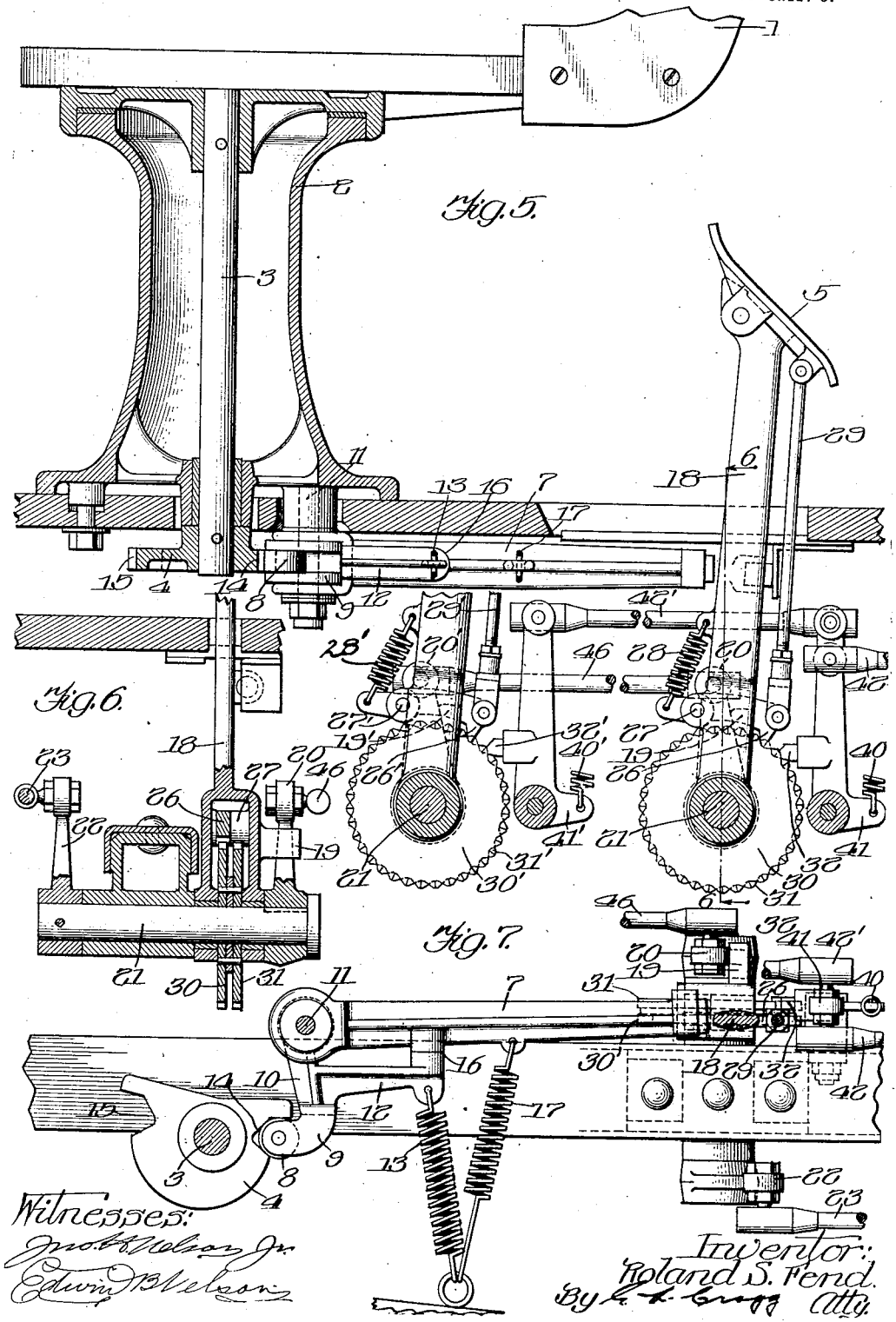

ROLAND S. FEND, OF CHICAGO, ILLINOIS, ASSIGNOR TO THE BAKER R. & L. COMPANY, OF CLEVELAND, OHIO, A CORPORATION OF OHIO.

AUTOMOBILE.

1,337,008.     Specification of Letters Patent.     Patented Apr. 13, 1920.

Application filed January 27, 1914, Serial No. 814,664. Renewed September 30, 1916. Serial No. 123,195.

*To all whom it may concern:*

Be it known that I, ROLAND S. FEND, a citizen of the United States, residing at Chicago, in the county of Cook and State of Illinois, have invented a certain new and useful Improvement in Automobiles, of which the following is a full, clear, concise, and exact description, reference being had to the accompanying drawings, forming a part of this specification.

My invention relates to vehicles and in certain of its aspects relates particularly to automobiles. Generally speaking, the invention has for one of its objects the provision of means for preventing the application of motor driving power, such as electric current, to the driving motor of an automobile while the brakes are set. Other features of the invention are of service in connection with those automobiles which are governed in their operation from either a forward or rear seat and operate to prevent the brakes from being set at one seat when the automobile is to be controlled at the other seat and also serve to effect simultaneous similar operations of the brake controlling equipment at both seats when such equipment individual to one seat is operated.

I will explain my invention more fully by reference to the accompanying drawings showing the preferred embodiment thereof and in which Figure 1 is a skeleton side view of a portion of the automobile equipped with the apparatus of the invention; Fig. 2 is a plan view of equipment illustrated in Fig. 1, one side portion of the automobile being removed for lack of room; Fig. 3 is a plan view of a part of the equipment shown in Fig. 2 on a larger scale; Fig. 4 is a sectional view on line 4 4 of Fig. 3; Fig. 5 is a view in sectional elevation on line 5 5 of Fig. 2, a part of the mechanism individual to the forward seat being broken away and shown nearer the mechanism individual to the rear seat than it obviously occupies in practice, because of lack of space; Fig. 6 is a sectional elevation on line 6 6 of Fig. 5; and Fig. 7 is a plan view of certain parts.

Like parts are indicated by similar characters of reference throughout the different figures.

The forward seat 1 is rotatably supported upon a pedestal 2 and has a depending shaft 3 in fixed relation therewith upon which a cam 4 is secured to rotate with the seat. In the particular embodiment of the invention shown the seat 1 faces forwardly when the automobile is to be controlled in its speed and direction of travel by the person sitting in this seat and when the automobile is not to be governed from this seat it is preferable to turn such seat to face the rear. When the seat 1 faces forwardly the brake pedal 5 individual to the rear driver's seat should not then be operable, and if the brake has been set before the front seat has been faced forwardly it should thereafter be prevented from being reset, after being released, while the seat 1 faces forwardly. To these ends the cam 4 adjusts the position of the stop 7, according to the position of the seat 1, to prevent or permit the operation of the rear pedal 5 under the circumstances set forth. A cam roller 8 engages and is operated by the cam 4 and is rotatably mounted upon a branch 9 of a lever 10 which is pivotally mounted at 11, the other branch 12 of the lever 10 being connected with a spring 13 which operates upon said lever to maintain the roller 8 in constant engagement with the cam, the roller being received in a cam recess 14 when the seat 1 has been brought to its forward facing position and being received in the cam recess 15 when the seat 1 is brought to its rear facing position. The stop lever 7 is also pivoted at 11 but is free to move with respect to the lever 10, the lever 7 being normally maintained in engagement with the lever 10 at 16 by means of a spring 17. When the roller is in the recess 14 and the pedal 5 is in a withdrawn position the spring 17 operates to bring the stop lever 7 into the plane of movement of the foot lever 18 which belongs to the rear seat and upon which the pedal 5 is mounted, the spring 17 then effecting engagement at 16 between the elements 7 and 10. If the roller 8 is received within the cam recess 15 the lever 10 is shifted in a counter-clockwise direction from the position it previously held, this position being maintained while the seat 1 faces rearwardly, during which time the stop lever 7 is out of the plane of movement of the foot lever 18 so that the brake may be operated while the front seat faces rearwardly. If the rear brake lever remains set while the front seat is being turned to face forwardly the stop lever 7 will be prevented from following the lever 10 by the foot lever 18 which is then in the return path of the stop lever 7 so that there then would be a separation of the elements 7 and 10 at 16. When the rear foot lever 18 is restored to its non-braking position, however, it is removed from the return path of the stop lever 7, whereupon the spring 17 will reëffect engagement of the stop lever 7 with the lever 10 at 16 so that the stop lever will be placed in the plane of movement of the foot lever 18 to prevent a reoperation of the rear brake lever while the seat 1 faces forwardly. By apparatus shortly to be described, if the foot lever 18 is in its forward position while the seat 1 is facing forwardly, such foot lever will automatically be restored to its normal, idle, position when the automobile motor controller is operated for putting the motor into service, thereafter to be prevented from being reoperated, by the lever 7, while the seat 1 is facing forwardly. By means of my invention the motor controlling mechanism serves to release the brake if set whether it has been applied from the forward or rear seat.

I will first describe the manner of applying the brake from the rear seat and the manner of releasing it by the controller mechanism then operated from the rear seat. The foot lever 18 carries a lug 19 which engages an arm 20 that is fixed upon one end of a shaft 21, this shaft carrying an arm 22 at its other end, a brake actuating rod 23 being connected with the upper end of the arm 22. The rod 23 is connected with an equalizer bar 24 having connection with the brake actuating rods 25, there being one such rod on each side of the vehicle, each rod being connected at its rear end with a brake band which will automatically release its braking engagement when the rod 23 is not set to a brake holding position. A holding pawl 26 is pivotally mounted at 27 upon the foot lever 18, the holding end of the pawl being pressed downwardly by a spring 28 intervening between the tail of the pawl and the foot lever 18. The pedal 5 is connected with the pawl 26 through a link 29 whereby the pawl may be lifted when the pedal 5 is pressed downwardly at its forward end. The pawl 26 coöperates with the teeth of a holding ratchet wheel 30, this ratchet wheel being in fixed relation with a ratchet wheel 31 that coöperates with a holding pawl 32, the pawl 26 preventing the composite wheel 30, 31 from turning in a counter-clockwise direction while the pawl 32 prevents this composite wheel from turning in a clockwise direction, the wheels 30, 31 being capable of free turning movement about the shaft 21 under the assumption that both pawls 26 and 32 are disengaged. The brake set at the rear seat by the pedal 5 may be released by depressing the forward end of this pedal downwardly to withdraw the pawl 26 from the wheel 30, the brake automatically separating itself from the rotating part to be braked thereby. If the pawl 26 is not released from its wheel 30 it will coöperate with the pawl 32 to maintain the brake set. The pawl 32 is governed by the motor controller and is adapted to engage the teeth of the ratchet 31 when the controller is in a neutral position. When the controller is moved from this neutral position for the purpose of bringing the driving motor of the automobile into service, the pawl 32 will be released from its wheel 31 before the motor is brought into service so that the brake will be released before the motor can be brought into play. Thus neither pawl 26 nor 32 will alone hold the composite wheel 30, 31 so that when either of these pawls is out of engagement with its associate teeth the brake may be released. When both pawls are in engagement with their teeth however, the brake is maintained set after it has been applied, it being observed that the teeth on the wheel 30 slope oppositely to the teeth upon the wheel 31 in order that the pawls 26 and 32 may coöperate with each other and with the wheels 30 and 31 in holding the brake.

It having been assumed, in order to describe the brake mechanism, that the driver is now upon the rear seat 6 (the forward seat 1 then being turned to face the rear) the driver has charge of the controller handle 34 which is individual to his seat 6, this handle 34 operating a sprocket wheel 35 which in turn drives a sprocket chain 36 that drives a sprocket wheel 37 fixed upon the shaft 38 of the drum of a controller 39 which governs the circuits of the electric motor employed for operating the automobile. When the controller handle 34 is in the neutral position the pawl 32 is in engagement with the wheel 31, this engagement being maintained by a spring 40 attached to the outer end of one arm of the bell crank 41. The long arm of the bell crank is connected with one end of the rod 42 whose other end is connected with one end of a bell crank 43. The other end of the bell crank 43 carries a cam roller 44 which is pressed by the spring 40 into engagement with a cam 45 that is fixed with respect to and turns with the controller drum shaft 38. When the controller handle 34 is turned forwardly from its position at right angles to the length of the automobile, the controller drum is turned in a counter-clockwise direction so that the cam 45 will operate to depress the cam roller 44 to turn the bell crank 41 in a clockwise direction to withdraw the pawl 32 from engagement with the wheel 31, the first movement of the controller handle 34 being accompanied by the release of the brake which precedes the application of current to the motor so that the motor cannot drive the machine while the brakes are set. As illustrated, the controller handle 34 is limited to an operating range of 90°, the position of the usual pole changing switch determining whether the machine is to go forward or backward.

The brake controlling mechanism individual to the forward seat 1 is similar to the brake controlling mechanism individual to the rear seat, parts of the forward brake controlling mechanism which are similar to parts of the rear brake controlling mechanism being given similar characters of reference with exponent prime marks added. The bell cranks 41, 41$^1$ are connected by a rod 42$^1$ so that the relationship of both pawls 32, 32$^1$ with their wheels 31, 31$^1$ will always be identical with identical consequences. The arms 20, 20$^1$ are connected by a rod 46 so that the movements of both of the arms 20, 20$^1$ will always be identical with identical results, the rod 46 being connected with the upper end of the arm 20.

While I have herein shown and particularly described the preferred embodiment of my invention I do not wish to be limited to the precise details of construction shown as changes may readily be made without departing from the spirit of the invention, but having thus described my invention I claim as new and desire to secure by Letters Patent the following:

1. An automobile having forward and rear seats from either of which it is to be controlled; controller mechanism for the motor and having two operating handles, one individual to each of said seats; braking mechanism for checking the travel of the automobile; two brake levers and arms engageable thereby for operating the braking mechanism and each individual to a seat, said brake lever arms being connected to cause the motions of one to occasion similar motions in the other; two devices for setting the braking mechanism and each individual to a seat, said setting devices being connected to cause the motions of one to occasion similar motions in the other; two brake releasing devices each individual to a seat and connected to cause the motions of one to occasion similar motions in the other; and a device common to and operable by each controller handle for operating the releasing devices to release the braking mechanism when the motor is brought into service.

2. An automobile having forward and rear seats from either of which it is to be controlled; controller mechanism for the motor and having two operating handles, one individual to each of said seats; braking mechanism for checking the travel of the automobile; two brake levers and arms engageable thereby for operating the braking mechanism and each individual to a seat, said brake lever arms being connected to cause the motions of one to occasion similar motions in the other; two devices for setting the braking mechanism and each individual to a seat, said setting devices being connected to cause the motions of one to occasion similar motions in the other; two brake releasing devices each individual to a seat and connected to cause the motions of one to occasion similar motions in the other; and a device operable by each controller handle for operating the releasing devices to release the braking mechanism when the motor is brought into service.

3. An automobile having forward and rear seats from either of which it is to be controlled; controller mechanism for the motor and having two operating handles, one individual to each of said seats; braking mechanism for checking the travel of the automobile, two brake levers, and arms engageable thereby for operating the braking mechanism and each individual to a seat, said brake lever arms being connected to cause the motions of one to occasion similar motions in the other; mechanism for setting the braking mechanism; two brake releasing devices each individual to a seat and connected to cause the motions of one to occasion similar motions in the other; and a device operable by each controller handle for operating the releasing devices to release the braking mechanism when the motor is brought into service.

4. An automobile having forward and rear seats from either of which it is to be controlled; controller mechanism for the motor and having two operating handles, one individual to each of said seats; braking mechanism for checking the travel of the automobile; two brake levers and arms engageable thereby for operating the braking mechanism and each individual to a seat, said brake lever arms being connected to cause the motions of one to occasion similar motions in the other; two devices for setting the braking mechanism and each individual to a seat, said setting devices being connected to cause the motions of one to occasion similar motions in the other; brake releasing means; and a device operable by each controller handle for operating the brake releasing means to release the braking mechanism when the motor is brought into service.

5. An automobile having forward and rear seats from either of which it is to be controlled; controller mechanism for the motor and having two operating handles, one individual to each of said seats; braking mechanism for checking the travel of the automobile; two brake levers and arms engageable thereby for operating the braking mechanism and each individual to a seat, said brake lever arms being connected to cause the motions of one to occasion similar motions in the other; mechanism for setting the braking mechanism; brake releasing means; and a device operable by each controller handle for operating the brake releasing means to release the braking mechanism when the motor is brought into service.

6. A vehicle having forward and rear seats from either of which it is to be controlled; two operating handles, one individual to each of said seats; braking mechanism for checking the travel of the vehicle; two brake levers and arms engageable thereby for operating the braking mechanism and each individual to a seat, said brake lever arms being connected to cause the motions of one to occasion similar motions in the other; two devices for setting the braking mechanism and each individual to a seat, said setting devices being connected to cause the motions of one to occasion similar motions in the other; two brake releasing devices each individual to a seat and connected to cause the motions of one to occasion similar motions in the other; and a device common to and operable by each controller handle for operating the releasing devices to release the braking mechanism when the motor is brought into service.

7. A vehicle having forward and rear seats from either of which it is to be controlled; two operating handles, one individual to each of said seats; braking mechanism for checking the travel of the vehicle; two brake levers and arms engageable thereby for operating the braking mechanism and each individual to a seat, said brake lever arms being connected to cause the motions of one to occasion similar motions in the other; two devices for setting the braking mechanism and each individual to a seat, said setting devices being connected to cause the motions of one to occasion similar motions in the other; two brake releasing devices each individual to a seat and connected to cause the motions of one to occasion similar motions in the other; and a device operable by each handle for operating the releasing devices to release the braking mechanism when the motor is brought into service.

8. A vehicle having forward and rear seats from either of which it is to be controlled; two operating handles, one individual to each of said seats; braking mechanism for checking the travel of the vehicle; two brake levers and arms engageable thereby for operating the braking mechanism and each individual to a seat, said brake lever arms being connected to cause the motions of one to occasion similar motions in the other; mechanism for setting the braking mechanism; two brake releasing devices each individual to a seat and connected to cause the motions of one to occasion similar motions in the other; and a device operable by each handle for operating the releasing devices to release the braking mechanism when the motor is brought into service.

9. A vehicle having forward and rear seats from either of which it is to be controlled; two operating handles, one individual to each of said seats; braking mechanism for checking the travel of the vehicle; two brake levers and arms engageable thereby for operating the braking mechanism and each individual to a seat, said brake lever arms being connected to cause the motions of one to occasion similar motions in the other; two devices for setting the braking mechanism and each individual to a seat, said setting devices being connected to cause the motions of one to occasion similar motions in the other; brake releasing means; and a device operable by each handle for operating the brake releasing means to release the braking mechanism when the motor is brought into service.

10. A vehicle having forward and rear seats from either of which it is to be controlled; two operating handles, one individual to each of said seats; braking mechanism for checking the travel of the vehicle; two brake levers and arms engageable thereby for operating the braking mechanism and each individual to a seat, said brake lever arms being connected to cause the motions of one to occasion similar motions in the other; mechanism for setting the braking mechanism; brake releasing means; and a device operable by each handle for operating the brake releasing means to release the braking mechanism when the motor is brought into service.

11. A vehicle having forward and rear seats from either of which control thereof may be effected; braking mechanism for checking the travel of the vehicle; mechanism individual to each seat for operating said braking mechanism, the mechanism at one of these seats including a brake actuating lever; a stop that may be placed in the path of said lever to prevent it from applying the brake; means operated at the other seat for placing said stop in the working path of said lever; and a spring enabling the stop, when operated upon to place it in the working path of said lever, to engage said lever upon one side of its plane of movement if this lever has been previously applied and operating to place the stop in the working path of this lever when such lever is restored to normal.

12. A vehicle having forward and rear seats from either of which control thereof may be effected, the forward seat being adapted to be turned to face forwardly or rearwardly; braking mechanism for checking the travel of the vehicle; mechanism individual to each seat for operating said braking mechanism, the mechanism at the rear seat including a brake actuating lever; a stop that may be placed in the path of said lever to prevent it from applying the brake; means operated by the forward seat when turned to a forward facing position for placing said stop in the working path of said lever; and a spring enabling the stop, when operated upon to place it in the working path of said lever, to engage said lever upon one side of its plane of movement if this lever has been previously applied and operating to place the stop in the working path of this lever when such lever is restored to normal.

13. An automobile having forward and rear seats from either of which it is to be controlled; controller mechanism for the motor and having two operating handles, one individual to each of said seats; braking mechanism for checking the travel of the automobile; two brake levers for operating the braking mechanism and each individual to a seat; two devices for setting the braking mechanism and each individual to a seat, said setting devices being connected to cause the motions of one to occasion similar motions in the other; two brake releasing devices each individual to a seat and connected to cause the motions of one to occasion similar motions in the other; and a device common to and operable by each controller handle for operating the releasing devices to release the braking mechanism when the motor is brought into service.

14. An automobile having forward and rear seats from either of which it is to be controlled; controller mechanism for the motor and having two operating handles, one individual to each of said seats; braking mechanism for checking the travel of the automobile; two brake levers for operating the braking mechanism and each individual to a seat; two devices for setting the braking mechanism and each individual to a seat, said setting devices being connected to cause the motions of one to occasion similar motions in the other; two brake releasing devices each individual to a seat and connected to cause the motions of one to occasion similar motions in the other; and a device operable by each controller handle for operating the releasing devices to release the braking mechanism when the motor is brought into service.

15. An automobile having forward and rear seats from either of which it is to be controlled; controller mechanism for the motor and having two operating handles, one individual to each of said seats; braking mechanism for checking the travel of the automobile; two brake levers for operating the braking mechanism and each individual to a seat; mechanism for setting the braking mechanism; two brake releasing devices each individual to a seat and connected to cause the motions of one to occasion similar motions in the other; and a device operable by each controller handle for operating the releasing devices to release the braking mechanism when the motor is brought into service.

16. An automobile having forward and rear seats from either of which it is to be controlled; controller mechanism for the motor and having two operating handles, one individual to each of said seats; braking mechanism for checking the travel of the automobile; two brake levers for operating the braking mechanism and each individual to a seat; two devices for setting the braking mechanism and each individual to a seat, said setting devices being connected to cause the motions of one to occasion similar motions in the other; brake releasing means; and a device operable by each controller handle for operating the brake releasing means to release the braking mechanism when the motor is brought into service.

17. An automobile having forward and rear seats from either of which it is to be controlled; controller mechanism for the motor and having two operating handles, one individual to each of said seats; braking mechanism for checking the travel of the automobile; two brake levers for operating the braking mechanism and each individual to a seat; mechanism for setting the braking mechanism; brake releasing means; and a device operable by each controller handle for operating the brake releasing means to release the braking mechanism when the motor is brought into service.

18. A vehicle having forward and rear seats from either of which it is to be controlled; two operating handles, one individual to each of said seats; braking mechanism for checking the travel of the vehicle; two brake levers for operating the braking mechanism and each individual to a seat; two devices for setting the braking mechanism and each individual to a seat, said setting devices being connected to cause the motions of one to occasion similar motions in the other; two brake releasing devices each individual to a seat and connected to cause the motions of one to occasion similar motions in the other; and a device common to and operable by each controller handle for operating the releasing devices to release the braking mechanism when the motor is brought into service.

19. A vehicle having forward and rear seats from either of which it is to be controlled; two operating handles, one individual to each of said seats; braking mechanism for checking the travel of the vehicle;

two brake levers for operating the braking mechanism and each individual to a seat; two devices for setting the braking mechanism and each individual to a seat, said setting devices being connected to cause the motions of one to occasion similar motions in the other; two brake releasing devices each individual to a seat and connected to cause the motions of one to occasion similar motions in the other; and a device operable by each handle for operating the releasing devices to release the braking mechanism when the motor is brought into service.

20. A vehicle having forward and rear seats from either of which it is to be controlled; two operating handles, one individual to each of said seats; braking mechanism for checking the travel of the vehicle; two brake levers for operating the braking mechanism and each individual to a seat; mechanism for setting the brake mechanism; two brake releasing devices each individual to a seat and connected to cause the motions of one to occasion similar motions in the other; and a device operable by each handle for operating the releasing devices to release the braking mechanism when the motor is brought into service.

21. A vehicle having forward and rear seats from either of which it is to be controlled; two operating handles. one individual to each of said seats; braking mechanism for checking the travel of the vehicle; two brake levers for operating the braking mechanism and each individual to a seat; two devices for setting the braking mechanism and each individual to a seat, said setting devices being connected to cause the motions of one to occasion similar motions in the other; brake releasing means; and a device operable by each handle for operating the brake releasing means to release the braking mechanism when the motor is brought into service.

22. A vehicle having forward and rear seats from either of which it is to be controlled; two operating handles, one individual to each of said seats; braking mechanism for checking the travel of the vehicle; two brake levers for operating the braking mechanism and each individual to a seat; mechanism for setting the braking mechanism; brake releasing means; and a device operable by each handle for operating the brake releasing means to release the braking mechanism when the motor is brought into service.

23. An automobile including forward and rear seats from either of which it is to be controlled; controlling mechanism for the motor of the automobile and provided with governing means at each seat; braking mechanism; means individual to each seat and there operable for actuating the braking mechanism; and releasing mechanism for releasing the brake when applied at either seat, this releasing mechanism being inter-related with the controller governing means at each seat to be operated thereby when actuated from idle condition to bring the motor into service.

24. An automobile including forward and rear seats from either of which it is to be controlled; controlling mechanism for the motor of the automobile and provided with governing means at each seat; braking mechanism; means individual to each seat and there operable for actuating the braking mechanism; and releasing mechanism for releasing the brake when applied at either seat, this releasing mechanism being inter-related with the controller governing means at a seat to be operated thereby when actuated from idle condition to bring the motor into service.

In witness whereof, I hereunto subscribe my name this twenty third day of January A. D., 1914.

ROLAND S. FEND.

Witnesses:
ETTA L. WHITE,
G. L. CRAGG.